United States Patent [19]

Magnolato

[11] 4,282,264
[45] Aug. 4, 1981

[54] PROCESS FOR REMOVING BITTER TASTE FROM A FRUIT OR VEGETABLE EXTRACT, AND THE DEBITTERED EXTRACT THUS OBTAINED

[75] Inventor: Daniele Magnolato, Chardonne, Switzerland

[73] Assignee: Societe d'Assistance Technique Pour Produits Nestle S.A., Lausanne, Switzerland

[21] Appl. No.: 114,681

[22] Filed: Jan. 23, 1980

[30] Foreign Application Priority Data

Jan. 26, 1979 [CH] Switzerland ............................ 786/79

[51] Int. Cl.³ ............................ A23L 2/00; A23L 2/28
[52] U.S. Cl. .................................. 426/599; 426/655; 426/387; 426/422
[58] Field of Search ............... 426/271, 599, 655, 422, 426/427, 387

[56] References Cited

U.S. PATENT DOCUMENTS

| 2,151,582 | 3/1939 | Block | 426/422 X |
| 2,375,550 | 5/1945 | Grossman | 426/427 X |
| 3,463,763 | 8/1969 | Griffiths | 426/422 X |
| 3,989,854 | 11/1976 | Chandler et al. | 426/599 X |
| 4,160,042 | 7/1979 | Farr et al. | 426/422 X |

*Primary Examiner*—Robert A. Yoncoskie

[57] ABSTRACT

The present invention relates to the treatment of fruit and vegetable extracts in order to reduce the amount of bitter substances contained therein.

This process comprises bringing the extract into contact with a solid ligneous adsorbent of vegetable origin, derived for example from carob, and then collecting the debittered extract after having separated it from the adsorbent.

10 Claims, No Drawings

PROCESS FOR REMOVING BITTER TASTE FROM A FRUIT OR VEGETABLE EXTRACT, AND THE DEBITTERED EXTRACT THUS OBTAINED

The present invention relates to the treatment of fruit or vegetable extracts in order to reduce the amount of bitter substances contained therein, since these are sometimes considered undesirable, either for reasons of taste linked to certain food habits, or simply for physiological reasons. The invention applies particularly to fruit or vegetable extracts whose bitterness or extreme bitterness is considered a drawback.

Several techniques for reducing bitterness are known, but either these are not very selective (treatment with solvents), or they are expensive (resin or gel adsorption, enzymatic treatment), their use seems rather academical, or at least restricted to products of great added value.

The present invention is not subjected to such limitations. It relates to a process for removing bitter taste from a fruit or vegetable extract by selective adsorption, using a cheap, natural material and is characterised in that the extract is brought into contact with a finely divided, solid ligneous adsorbent of vegetable origin, hereafter referred to as "adsorbent", and that the debittered extract is collected after having been separated from the adsorbent.

The fruit or vegetable extract may be as much an extract obtained by lixiviation with an appropriate solvent (water, alcohol, etc.) as an extract obtained by pressing, commonly called juice. In this connection, mention can be made of the juice of citrus fruit, e.g. grapefruit, lemon or bitter orange juice. If such an extract contains suspended matter, it is clarified (e.g. centrifuging) before being brought into contact with the adsorbent and the substances thus collected can be reintroduced into the extract after removal of the bitter taste. Such a juice can, of course, contain alcohol, obtained for example after a fermentation process (cider, etc.).

Different kinds of solid ligneous adsorbent of vegetable origin can be employed in the present process. Possible examples include the solid fibrous particles obtained by coarse grinding of the wood-like parts of plants, such as the pulps, pods, shells, husks of fruits or leguminous plants, or barks. A material which is particularly suitable and which is available in large quantities consists of the fibrous residues originating from carobs from which the sugars have been extracted with hot water.

The carob or locust tree, *Ceratonia siliqua* (Leguminosae family) a tree which can attain a height of up to 20 meters, is a native of Syria and is now grown in mediterranean countries. Its fruit contains seeds whose endosperm is the source of locust bean gum. The pericarp or pod is either discarded or used either for producing a low quality syrup (carob syrup), or for feeding livestock. The residues are usually discarded.

Thus the raw material used to produce the adsorbent is made up either of pods or of residues from the sugar extraction. It is therefore worthwhile treating this material by any suitable method to remove impurities, sugars and carob aromas. Usually the material is coarsely ground. When treating non-desugared pods, a convenient method consists of cooling them to $-40°$ C. and grinding. The carob particles or partially desugared residues undergo a treatment with hot water to eliminate the sugars. For example, a series of extraction cells may be used to extract the sugars with hot water, e.g. at 95° C. The carob particles are then advantageously dried, under a slight vacuum for example, which renders them odourless.

A convenient alternative is to treat these particles with an acid, and then optionally to subject them to a deodorisation treatment, for example steam stripping. In the first case any suitable acid may be employed, such as dilute or concentrated hydrochloric, sulphuric or phosphoric acid, for example. Treatment with dilute hydrochloric acid during 1 to 3 hours at room temperature is suitable.

For practical reasons, it is preferable to use a material of relatively regular particle size. The material is therefore sieved, the size of the retained particles being conveniently from 0.3 mm to 5 mm and preferably from 0.5 mm to 4 mm.

The fruit or vegetable extract may be brought into contact with the adsorbent in various ways. For example the extract may be percolated through a column of adsorbent, and in this case, the debittered extract collected directly at the bottom of the column. It is also possible to suspend the adsorbent in the extract, in which case separation means has to be foreseen. This may be carried out quite simply by siphoning off after decanting, or by filtering.

The time of contact between the adsorbent and the fruit or vegetable extract, as well as various other parameters, such as the temperature at which this contact is effected, and the proportion of adsorbent in relation to the extract, depend both on the degree of debittering desired and on practical working methods. In general, contact times of the order of 5 to 60 minutes for temperatures ranging from 10° to 60° C. are satisfactory. Advantageous working proportions of extract/adsorbent are between 10 and 400 ml/g. After adsorption, the adsorbent may be washed with water at the same temperature or at a higher temperature provided it is not above 60° C.

The fruit or vegetable extract, for its part, may contain, after clarification, from 1% to 25% and preferably from 5% to 10% by weight of soluble matter. This extract may have been freed of its aromas beforehand, by steam stripping, and the aromas collected separately for later reintroduction.

According to one method for carrying out the process, desugared carob particles, which have preferably been washed with acid, are suspended in a previously clarified fruit or vegetable extract containing in the region of 5% to 15% of dry matter. After a period of time of between 10 and 60 minutes, during which the suspension is constantly stirred, the solids are separated from the liquid by filtration, and the debittered extract thus recovered. In a variation of this method, the carobs are re-suspended in water for a rinse and after separation the washings combined with the debittered extract. In this method, the adsorption may be carried out at room temperature, for example, while the washing is effected at 50° C. The mixture thus obtained is then treated according to conventional fruit and vegetable extract technology. If so wished, any solid matter removed from the extract before its contact with the adsorbent may be reintroduced to obtain a final product with a cloudy appearance or with pulp in suspension.

According to the second preferred method, beds of desugared carob particles, placed in columns, are employed and the fruit or vegetable extract percolated through these columns. The debittered extract is thus recovered directly. Fairly coarse particles should be used to avoid rapid blocking of the columns. A wash may be carried out as above.

The quality of the extracts obtained does not suffer from the treatment according to the invention. On the contrary, neither the intensity nor the balance of the flavour of the extracts is affected. On the other hand, in the opinion of tasters who prefer only slightly bitter fruit or vegetable extracts, the treatment proves to be clearly beneficial.

The extracts may be drunk as such, as fruit juices for example. They may also be used as flavouring agents in numerous food preparations.

These extracts may, of course, be dried by spray or freeze-drying.

The following examples illustrate how the invention is carried out.

EXAMPLE 1

10 kg of carob residues originating from the extraction of sugar are ground to a particle size of less than 2 mm. These are placed in a vessel containing 50 kg of deionised water at 60° C. and stirred for 30 minutes at the same temperature.

The solids are separated, stirred with 50 kg of deionised water at 60° C. and separated again. 25 liters of 2 N hydrochloric acid are then added and stirred for 2 to 3 hours at 20° C. The solids are separated and washed with deionised water until the washings are colourless. The solids are again separated and rendered odourless by steam stripping under slightly reduced pressure (50 mm Hg, 100° C.) during 2 to 3 hours. After separation the carob particles are dried and screened on a 0.3 mm sieve. Particles of 0.3 mm to 2 mm are thus collected. In the preceeding treatment, 2 N sulphuric or phosphoric acid may be used instead of hydrochloric acid with similar results.

The adsorbent, prepared as above, is suspended at room temperature in grapefruit juice, obtained by pressing whole fruit with the peel and clarified by centrifuging. The suspension is stirred for 15 minutes at room temperature. A proportion of 10 g of adsorbent to 400 ml of juice is employed. The phases are separated by centrifuging and the liquid phase, the debittered juice, collected.

EXAMPLE 2

40 g of adsorbent, prepared as at the beginning of example 1, are placed in a column. 1.5 liters of whole grapefruit juice, obtained by pressing and clarifying, are percolated through it at room temperature. The juice coming from the bottom of the column is debittered.

85% of tasters who were presented with the debittered grapefruit juice judged it "slightly bitter" and 15% "medium bitter". In comparison, the non-debittered juice was described as "very bitter" by 85% of these same tasters.

EXAMPLE 3

The procedure is the same as in example 2, but after passing the juice to be treated through the column, the latter is washed with deionised water at 50° C. The washings are combined with the treated juice. The combined juice and washings are judged "slightly bitter" by 100% of the tasters.

As a comparison, the column is washed with water at 95° C. and the washings combined with the treated juice. This combination is judged "medium bitter" or "very bitter" by 70% of the tasters. It follows that a large part of the bitter substances has been desorbed, and thus returned to the juice.

I claim:

1. A process for debittering a citrus fruit extract or juice which comprises contacting the extract or juice with an adsorbent consisting of desugared carob particles at a temperature of between 10° and 60° C.

2. A process according to claim 1, wherein the adsorbent is pretreated by washing with an acid and/or steam stripping.

3. A process according to claim 1, wherein the particles of adsorbent have diameters of from 0.3 to 5 mm.

4. A process according to claim 1, wherein the extract or juice and the adsorbent are contacted for from 5 to 60 minutes.

5. A process according to claim 1, wherein the extract or juice and the adsorbent are contacted in extract or juice/adsorbent proportions of between 10 and 400 ml per gram.

6. A process according to claim 1, wherein the adsorbent is suspended in the citrus fruit extract or juice.

7. A process according to claim 1, wherein the fruit extract or juice is percolated through a column filled with adsorbent.

8. A process according to claim 1, wherein the extract or juice is steam stripped to remove its aromas before being brought into contact with the adsorbent and these aromas are recombined with the extract or juice after removal of its bitter taste.

9. A process according to claim 1, wherein the solids contained in the extract or juice are removed before it is brought in contact with the adsorbent and these solids are recombined with the extract or juice after debittering.

10. A process according to claim 1, wherein the adsorbent is washed with water at a temperature equal to or higher than that at which adsorption takes place, but not exceeding 60° C., and the washings are then combined with debittered extract or juice.

* * * * *